Patented Oct. 3, 1950

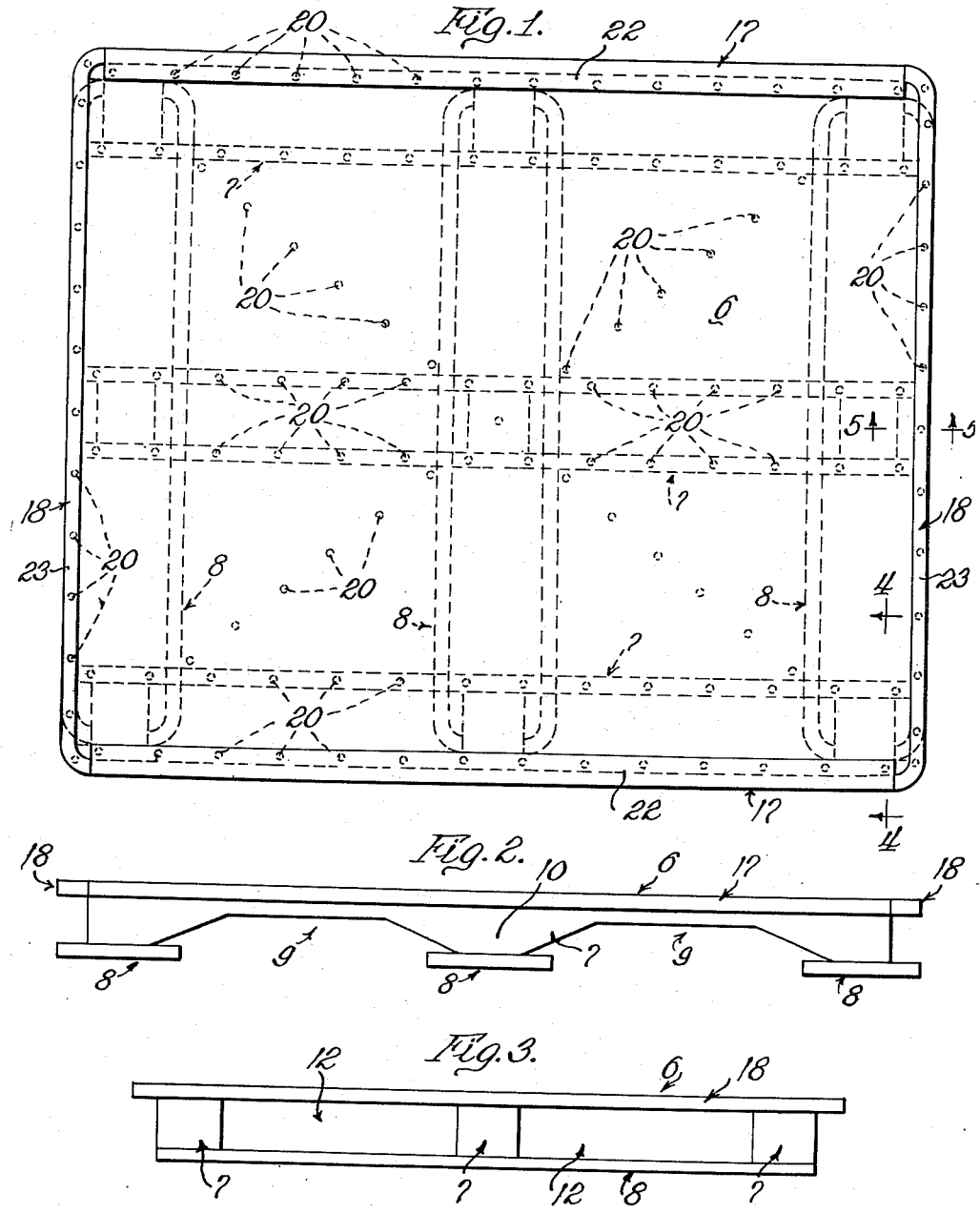

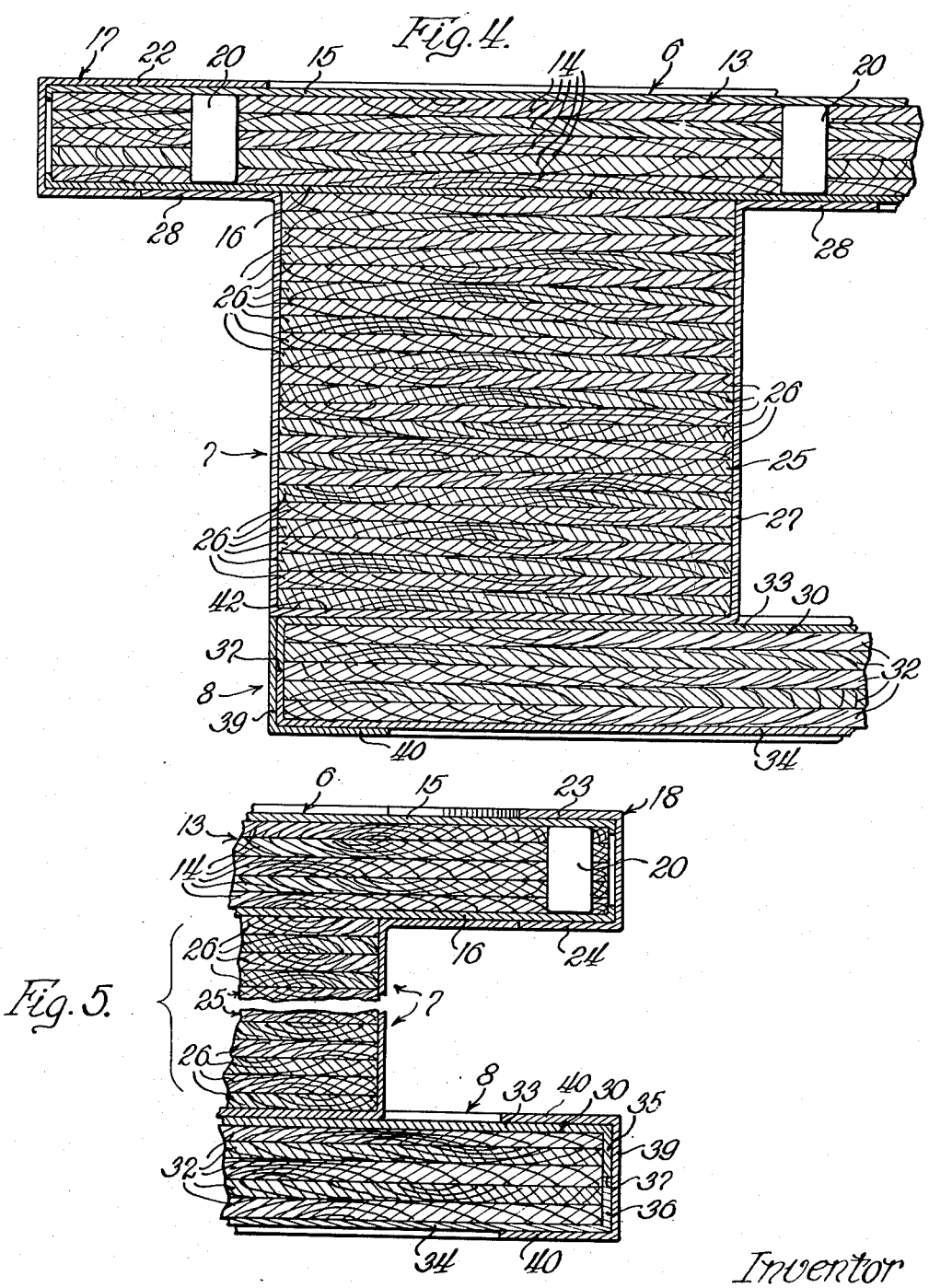

2,524,599

UNITED STATES PATENT OFFICE 2,524,599

PALLET

William J. Philp, Battle Creek, Mich., assignor to Clark Equipment Company, Buchanan, Mich., a corporation of Michigan Application September 6, 1946, Serial No. 695,271

6 Claims. (Cl. 248—120)

My present invention relates to improvements in pallets, and more particularly is concerned with pallets of the type known in the art as "four-way" pallets.

The platform of the pallet of my invention preferably comprises a laminated member, such as plywood, covered with suitable metal facing sheets, which construction in addition to being sturdy and of long life, presents a smooth even surface for the convenient handling of bagged goods such as flour, cornstarch, sugar and the like commodities without danger of ripping or tearing of the bags, or damaging of the goods. Further, prior pallets, having wood platforms, when used at docks and wharves frequently become damp or soaked with sea water, causing discoloration and damage to bagged goods of the character above indicated in addition to the damaging of the platform itself as by rotting and warping thereof. The wood type of platform is further objectionable due to splintering thereof, causing ripping of the bags in which the goods are packed.

In the copending application of Richard L. White, Serial No. 692,791, filed August 24, 1946, now abandoned, assigned to the assignee of my instant application, there is disclosed a pallet having a load supporting platform comprising a laminated member, such as plywood, having upper and lower metal facing sheets and including terminating telescoping flange elements thereof enclosing the edges of the laminated member, which construction avoids the aforementioned and other disadvantages of the known wood platforms. My present invention relates in part to an improved form of platform of the character of the above referred to application, it being an object of my invention to provide a platform comprising a laminated member, such as plywood, having upper and lower metal facing sheets in which the edges of the laminated member and the facing sheets are enclosed within channel members welded to the adjacent portions of the upper and lower facing sheets.

Further, in the application above noted the lower sheet metal facing sheet in the specific embodiment of the invention therein disclosed is provided with integral projections extending into conformably formed openings in the laminated member which projections at their upper ends are welded to portions of the upper facing sheet in juxtaposition thereof. This construction is effective to diminish bending stresses due to the weight of a load supported on the platform from producing sagging of the platform by preventing any relative sliding movement of the adjacent surfaces of the several layers making up the laminated member.

It is a further object of my invention to provide a construction for the purpose last noted comprising a plurality of pins extending through the laminated member, and which pins are welded at their opposite ends to the upper and lower facing sheets. The pins are preferably so distributed over the area of the laminated member as to divide this member most effectively into areas in which the bending stresses can best be confined.

A still further object is to provide a platform as last described having a plurality of pins as above noted disposed along the several edges of the plywood member in which certain of the aforementioned channel members along the edges of the laminated member are welded at portions thereof in juxtaposition of the portion of the facing sheets at the opposite ends of the pins.

A still further object is to provide a platform for a pallet or the like in which other of the aforementioned channel members along the edges of the laminated member are welded at portions thereof in juxtaposition of the portions of the upper facing sheet at the upper ends of said pins.

It is a further object of my invention to provide a pallet with a rectangular planar load supporting platform having a supporting structure comprising a plurality of leg and foot elements with the leg elements extending parallel to one pair of oppositely disposed edges of the platform and with the foot elements extending transversely across the leg elements or parallel to the other pair of oppositely disposed edges of the platform.

A further object is to provide a pallet as last noted in which the leg elements are formed with recesses opening upwardly thereinto to provide for the reception of the lift forks of an industrial truck from beneath either of the oppositely disposed parallel edges of the platform parallel with the leg elements.

A further object is to provide a pallet as last aforesaid in which the leg elements provide for positioning of said foot elements in spaced relation with respect to the pallet platform whereby the pallet may be engaged by the lift forks of an industrial truck from beneath either of the oppositely disposed edges of the platform extending crosswise with respect to the leg elements.

A further object is to provide a leg element comprising a laminated member, such as plywood, enclosed in a suitable sheet metal member having flanges at its upper end for securing the leg element as by welding to the under facing sheet of the platform.

A further object is to provide a pallet having a platform provided with reinforcing pins as noted together with a plurality of leg elements as last noted in which the flanges of the leg elements are welded to the under facing sheet at portions thereof in alinement with the lower ends of the reinforcing pins.

A further object is to provide a foot element comprising a laminated member, such as plywood, enclosed within upper and lower metallic sheet members secured in position by a peripheral channel member welded adjacent the edges of the upper and lower metal members.

A further object is to provide a pallet having leg and foot supporting elements of the character noted for the platform thereof in which the metal covering member of the leg member disposed remote from the platform is secured to the upper facing sheet of the foot element by welding.

A further object is to provide a pallet having elongated foot supporting elements to provide for a nested arrangement with other like pallets upon return shipment of the empty pallets, but which foot elements are of sufficient area to support the pallet and its load upon the floor or surface of the load of a lower pallet when the pallets and loads are stacked vertically.

An additional object is to provide foot members relatively narrow to provide nesting on return shipment but sufficient in area to support a pallet and its load adequately upon floor or surface of load of first tier of pallets when pallets and loads are stacked vertically.

The above and other objects and advantages of my invention will appear from the following detail description of a preferred embodiment thereof shown in the accompanying drawings, in which:

Figure 1 is a plan view of a pallet constructed in accordance with my invention;

Figure 2 is a side elevational view of the pallet of Figure 1;

Figure 3 is an end elevational view of the pallet of Figure 1;

Figure 4 is an enlarged detail vertical sectional view taken substantially on the line 4—4 of Figure 1, looking in the direction indicated by the arrows; and Figure 5 is an enlarged detail vertical sectional view partly broken away, taken substantially on the line 5—5 of Figure 1 looking in the direction indicated by the arrows.

Referring now to the drawings, the pallet therein shown comprises a load supporting platform 6, a plurality of leg elements or spaces 7 extending parallel with the opposed lengthwise extending edges of the platform 6, and a plurality of supporting foot elements 8 extending transversely across the bottom surfaces of the spacing portions of the leg elements 7 and parallel with the opposite end edges of the platform.

As shown in Figure 3, three leg elements 7 are provided with the outer two leg elements being spaced inwardly of the opposed length wise extending edges of and with the third leg element being positioned centrally of and intermediate the outer leg elements 7. Also, as will be clear from Figure 2, three foot elements 8 are provided, which foot elements extend transversely of and are secured to the leg elements 7. The leg elements 7 are provided with a pair of recesses 9—9 opening inwardly of the lower edges thereof with a pair of foot elements 8 being secured adjacent each of the opposite ends of the leg elements and with the third foot element 8 being secured to the legs 7 at the bottom edges of the portions 10 thereof between the recesses 9—9. The outer side or lengthwise edges of the outer foot elements 8 lie in alignment with the end edges of the platform 6, and as before noted, the end edges of the foot elements are disposed inwardly of the lengthwise edges of the platform.

In this arrangement of the platform, leg and foot elements it will be observed that a pair of lift forks of an industrial truck may be moved into position below the platform from below either of the lengthwise edges of the platform by entry thereof into the recesses 9—9 of the leg elements 7 as will be clear from Figure 2. Also, the pair of lift forks of an industrial truck may be moved into position below the platform 2 by entry thereof below the opposite end edges of the platform in the spaces 12—12 formed between adjacent leg elements 7 and the platform 6 and foot elements 8, thus forming what is known as a "four way" pallet. This arrangement of the leg and foot elements also provides for disposing a ship's sling beneath the edges of the platforms for the loading and unloading of the pallet at a dock.

Referring now to Figures 4 and 5, it will be seen that the platform 6 comprises a laminated member 13, such as plywood, formed of a plurality of superposed wood layers 14 glued together and having upper and lower metal facing surfaces 15 and 16, respectively, preferably of sheet metal of suitable gauge. If desired, the facing sheets may be galvanized, rust-proofed, or otherwise provided with protective coatings for resisting rusting or deleteriously affecting foodstuffs and similar goods to be transported by means of the pallet. The several edges of the upper and lower facing sheets are slightly bent over the edges of the plywood member 13. The lengthwise edges of the upper and lower facing sheets 15 and 16 and the adjacent edges of the plywood member are enclosed in metal channel members 17—17, which preferably are made of sheet metal, terminating somewhat short of the end edges of the plywood member. The bent-in end edges of the upper and lower facing sheets and the end edges of the plywood member 13 are enclosed in metal channel members 18—18 which are rounded at their opposite ends so as to terminate in abutting relation with the opposite ends of the channel members 17—17. A plurality of pins 20, such as shown in Figures 1, 4 and 5, extend through suitably preformed openings in the plywood member 13 and are secured at their opposite ends as by flash welding to the portions of facing sheets 15 and 16 in juxtaposition thereof. The pins 20 serve to diminish the bending stresses caused by a load on the platform by preventing relative sliding movement of the several layers 14 along the surfaces thereof in juxtaposition of each other, and arranged in such manner as to define unpinned areas of plywood so small as to possess the requisite stiffness to bending.

The channel members 17, as will be clear from Figure 4, have portions of the upper flanges 22 thereof welded to the portions of the upper facing sheet 15 which are welded to the upper ends of the pins 20 extending along the lengthwise edges of the platform below the flanges 22. In Figure 5 it will be seen that upper and lower flanges 23 and 24, respectively, of the channel members 18 are welded to the portions of the upper and lower facing sheets 15 and 16 which are welded to the upper and lower ends of pins 20 extending along the end edges of platform 6 within the channel members 18—18.

The several leg elements 7 are of identical construction and comprise a laminated member 25, such as of plywood, having a plurality of superposed wood layers 26 secured together with a suitable adhesive and encased in a metal channel member 27, preferably of sheet metal of suitable gauge, with the member 25 and channel member 27 being appropriately formed to provide the recesses 9—9. The channel member 27 is provided at its upper end with outwardly extending flanges 28—28 running lengthwise of the channel member and platform which flanges are suitably secured as by flash welding to the lower facing sheet 16 at the portions thereof welded to the lower ends of pins 20. It will be observed that a pair of rows of pins 20 are provided in the platform 6 for each of the leg elements 7, with each pair of rows of pins being in alignment with the flanges 28—28 of the channel members 27 of the leg elements for the securing thereof as by welding to the portions of the lower facing sheet in juxtaposition thereof and as last mentioned to the flanges 28—28 of the channel members 27.

As shown in Figures 4 and 5, the foot structures each comprise a laminated member, such as plywood, comprising a plurality of superposed wood layers 32 secured to each other along their adjacent faces by a suitable adhesive. The laminated member 30 is encased in upper and lower facing members 33 and 34, respectively, having peripheral flanges 35 and 36 extending normal to the faces thereof and adapted to have abutting relation at their free edges as shown at 37 with the flanges 35 and 36 enclosing the several edges of the member 30. The edges of the upper and lower facing members 35 and 36 are preferably enclosed within a metal protecting peripheral channel member 39 with the flanges 40—40 of the latter being welded to the outer surfaces of the members 35 and 36 along the edges thereof, and in which the abutting opposite ends of the channel member are welded to each other to receive the same in fixed position. It will be clear from Figure 4 that portions of the upper flanges 40 of the channel member 39 are cut away to provide a flush surface for welding of the lower end portion 42 of the leg elements with the upper facing sheets 33 of the foot structures 8.

Thus I have provided a laminated plywood pallet with plywood spacers and foot portions all encased in metallic surfaces, suitably welded to exclude moisture and air. This provides a permanent pallet which can be used indefinitely without deterioration, splintering, discoloration, etc. and which is still relatively light in weight, since the enclosing metal is of light gauge for surface protection and the plywood constitutes the load carrying media.

While I have shown what I consider to be a preferred embodiment of my invention, it will be understood that various modifications and rearrangements may be made therein without departing from the spirit and scope of my invention.

I claim:

1. A pallet comprising a planar rectangular platform, a plurality of leg elements secured to said platform and extending in parallel spaced relation with a pair of opposite edges of said platform, each of said leg elements having a pair of recesses intermediate its ends and opening inwardly of the lower edge thereof, a plurality of foot elements extending transversely of said leg elements and parallel with the other pair of opposite edges of said platform, said foot elements being secured to said leg elements at the ends thereof and intermediate the recesses of said leg elements to provide a pair of openings at either of said other pair of opposite edges of said platform for reception of a pair of lift forks of an industrial truck below said platform, said recesses in said leg elements providing for the reception of the lift forks of an industrial truck from either of said first pair of opposite edges of said platform below the latter.

2. A platform for a pallet or the like comprising a rectangular planar laminated member having a plurality of superposed layers, upper and lower metal facing sheets covering the surfaces of said laminated member, a pair of channel members enclosing one pair of opposite edges of said laminated member with the flanges of said channel members enclosing the adjacent outer surfaces of said upper and lower facing sheets, and a plurality of pins extending through said laminated member along said pair of opposite edges thereof with said pins being welded at their opposite ends to the adjacent portions of said upper and lower facing sheets, and said channel members being welded along their upper and lower flanges to the portions of said upper and lower facing sheets welded to the upper and lower ends of said pins.

3. A platform for a pallet or the like comprising a rectangular planar laminated member having a plurality of superposed layers, upper and lower metal facing sheets covering the surfaces of said laminated member, a first pair of channel members enclosing one pair of opposite edges of said laminated member with the flanges of said first channel members enclosing the adjacent outer surfaces of said facing sheets, a second pair of channel members enclosing the second pair of opposite edges of said laminated member with the flanges of said second channel members enclosing the adjacent outer surfaces of said facing sheets, a plurality of pins extending through said laminated member along the several edges thereof and welded at their upper and lower ends to the adjacent portions of said upper and lower facing sheets, respectively, said first channel members being welded along their upper flanges to the portions of said upper facing sheet welded to the upper ends of said pins extending along said one pair of opposite edges of said laminated member, and said second channel members being welded along their upper and lower flanges to the portions of said upper and lower ends of said pins extending along said second pair of opposite edges of said laminated member.

4. A pallet comprising a platform formed of a laminated member having upper and lower metal facing sheets covering the upper and lower surfaces thereof, a pair of channel members enclosing one pair of opposite edges of said laminated member with the flanges of said channel members enclosing the adjacent outer surfaces of said upper and lower facing sheets, a pair of spaced rows of pins extending through said laminated member along each of said one pair of opposite edges thereof with said pins being welded at their upper and lower ends to the adjacent portions of said facing sheets, said channel members being welded along their upper flanges to the portions of said upper facing sheet welded to the upper ends of said pins, a pair of platform supporting structures having leg elements extending lengthwise of said one pair of opposite edges of said laminated member each provided with a pair of lengthwise flanges with said last named flanges being welded to the portions of said lower facing sheet welded to the lower ends of said pins.

5. The pallet of claim 4 characterized by the provision of a third platform supporting structure having a third leg element extending parallel with said leg elements of said pair of platform supporting structures and intermediate the same, and a third row of a pair of pins extending through said laminating member intermediate said pair of spaced rows of pins along each of the one pair of opposite edges of said laminated member welded at their upper and lower ends to said upper and lower facing sheets, said third leg element having a pair of lengthwise extending spaced flanges welded to said lower facing sheet at the portion thereof welded to the lower ends of said third row of pins.

6. A pallet having a rectangular planar platform comprising a laminated member formed of a plurality of superposed layers and upper and lower metal facing sheets covering the upper and lower surfaces of said laminated member, a plurality of platform supporting structures each comprising elongated leg elements formed of a plurality of superposed layers enclosing within a metal channel member and extending parallel with one pair of opposite edges of said platform, said channel members having flanges at their upper edges welded to the lower facing sheet of said platform, and a plurality of elongated foot structures each comprising a plurality of superposed layers enclosed within upper and lower facing sheets and extending transversely of and parallel with the second pair of opposite edges of said platform, said foot structures being welded at their upper facing sheets to the lower end portions of said channel members of said leg elements.

WILLIAM J. PHILP.

REFERENCES CITED

The following references are of record in the file of this patent:

UNITED STATES PATENTS

| Number | Name | Date |
|---|---|---|
| 1,597,820 | Proctor et al. | Aug. 21, 1926 |
| 1,794,121 | Romine | Feb. 24, 1931 |
| 1,842,617 | Lupton | Jan. 26, 1932 |
| 2,009,056 | Schaffert | July 23, 1935 |
| 2,153,204 | Olson | Apr. 4, 1939 |
| 2,369,944 | Cahners | Feb. 20, 1945 |
| 2,372,055 | Braun | Mar. 20, 1945 |

FOREIGN PATENTS

| Number | Country | Date |
|---|---|---|
| 443,429 | Great Britain | Aug. 14, 1935 |